July 31, 1934.   C. G. SEYFERTH   1,968,573
FIFTH WHEEL CONSTRUCTION
Filed May 5, 1934    2 Sheets-Sheet 1

Inventor
Carl G. Seyferth
Charles B. Rasmussen
Atty.

July 31, 1934. C. G. SEYFERTH 1,968,573
FIFTH WHEEL CONSTRUCTION
Filed May 5, 1934 2 Sheets-Sheet 2
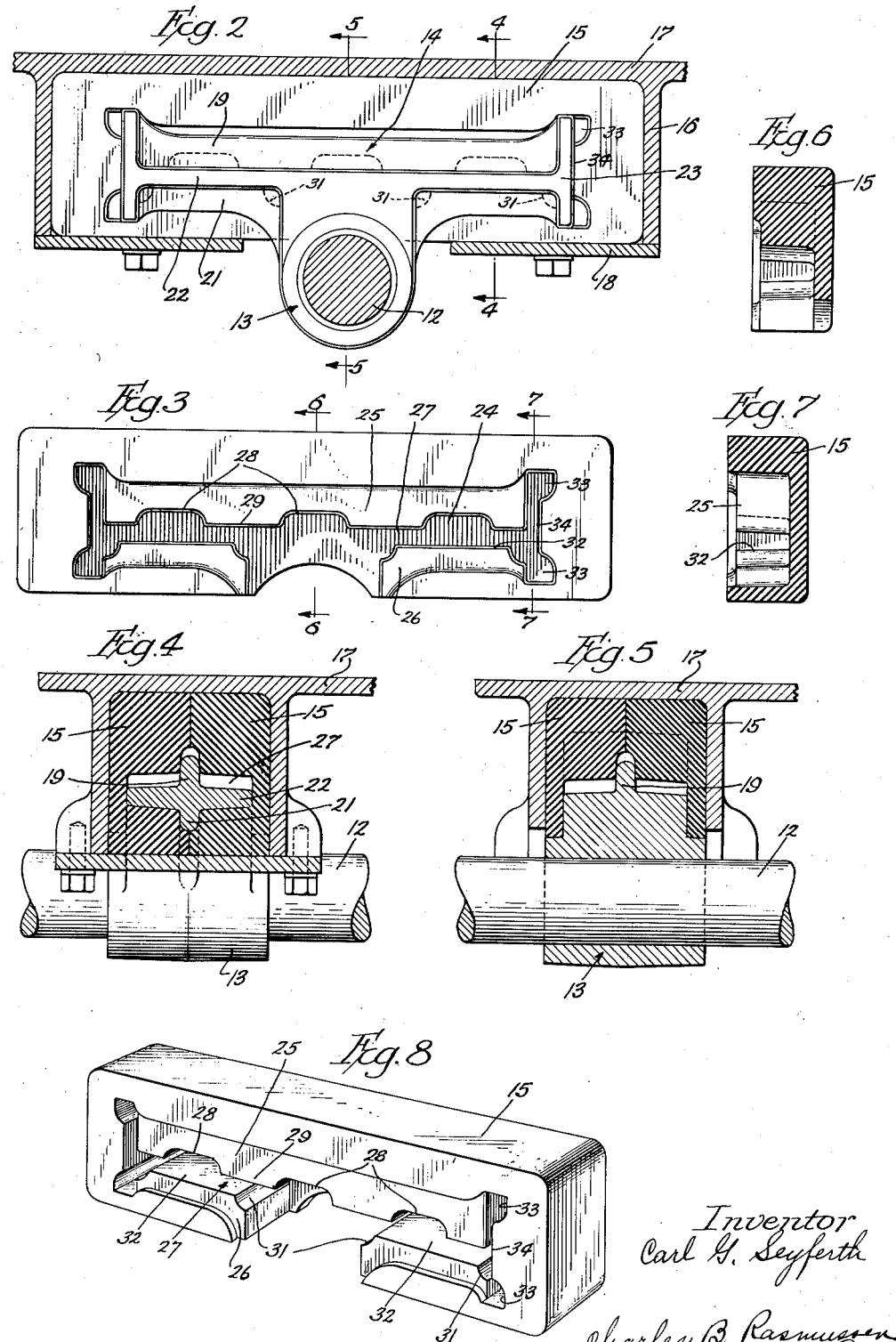
Inventor
Carl G. Seyferth
Charles B. Rasmussen
Atty.

Patented July 31, 1934

1,968,573

UNITED STATES PATENT OFFICE 1,968,573

FIFTH WHEEL CONSTRUCTION

Carl G. Seyferth, Muskegon, Mich., assignor to West Michigan Steel Foundry Co., Muskegon, Mich., a corporation of Michigan Application May 5, 1934, Serial No. 724,120

8 Claims. (Cl. 280—33.1)

This invention relates in general to fifth wheel constructions and has more particular reference to yieldable fifth wheel coupling means between a tractor and a trailer vehicle.

A principal object of the invention is the provision of a fifth wheel construction of the character described which embodies means for cushioning the shocks and jars encountered when the vehicle is started or stopped.

Another object of the invention is the provision of a fifth wheel construction embodying yieldable cushioning means interposed between the upper and lower fifth wheel elements and disposed in spaced relation to the latter, to minimize friction therebetween and to permit the free floating movement of the bearing elements of the structure.

Another important object of the invention is the provision of a fifth wheel construction which may be quickly and easily assembled and disassembled for replacement and repairs and in which the cushioning means is so constructed as to insure maximum efficiency and at the same time obtain a material saving in the amount of material employed.

A further object of the invention is the provision of a unitary cushioning member for the fifth wheel bearing, which may quickly and easily be assembled with the structure and removed therefrom for replacement or repair.

Numerous other objects and advantages of the invention will be apparent as it is better understood from the following description, which, when taken in connection with the accompanying drawings, discloses a preferred embodiment thereof.

On the drawings,

Fig. 2 is an enlarged longitudinal sectional view through the yieldable connection between the upper and lower fifth wheel elements;

Fig. 3 is a side elevational view of one of the cushioning members;

Fig. 4 is a vertical transverse sectional view taken substantially on the line 4—4 of Fig. 2;

Fig. 5 is a vertical transverse sectional view taken substantially on the line 5—5 of Fig. 2;

Fig. 6 is a vertical transverse sectional view taken substantially on the line 6—6 of Fig. 3;

Fig. 7 is a vertical transverse sectional view taken substantially on the line 7—7 of Fig. 3; and Fig. 8 is a perspective view of one of the cushioning members illustrating in detail the configuration of the recess provided therein.

Figure 1:
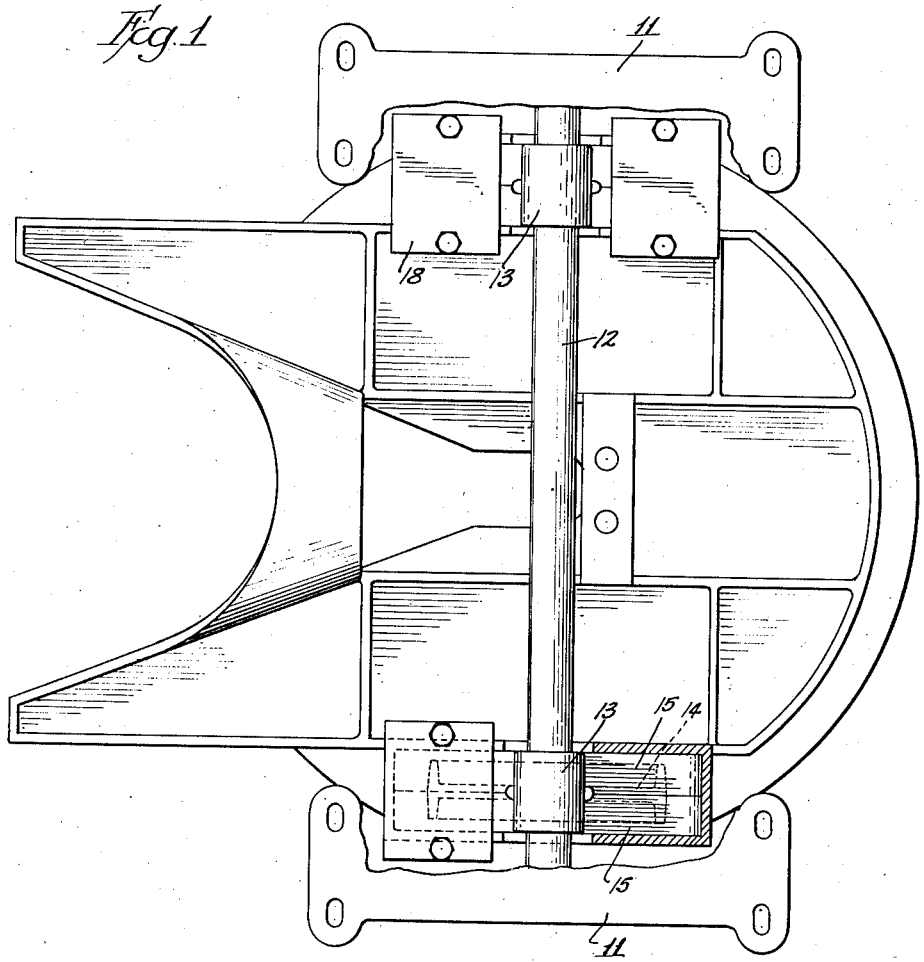
Figure 1 is a bottom plan view of a fifth wheel construction embodying the present invention.

Referring to the drawings, a fifth wheel construction embodying the present invention is illustrated as generally comprising a pair of spaced bracket members 11 adapted to be secured to the chassis of a tractor or the like, and which support a transversely extending cross shaft 12 (Fig. 1). Journaled on the cross shaft 12 is a pair of bearing members 13 each of which is provided with an elongated portion, indicated generally at 14, which is mounted for free floating movement between a pair of cushioning members 15 removably contained within a housing 16 formed integrally with the upper fifth wheel element 17 (Fig. 2).

The housing 16 is provided with a removable bottom wall 18 by means of which access may be had to the interior of the housing in assembling the parts or for the purpose of replacement or repairs.

The elongated portion 14 of the bearing 13 extends longitudinally of the vehicle and is preferably cast with upper and lower longitudinally extending rib portions 19 and 21, horizontally extending rib portions 22, and with vertically extending end or buffer plates 23, the general result being a casting of substantially cruciform cross-section, as shown in Fig. 4.

The cushioning members 15 are arranged one on each side of the elongated portion 14 and extend longitudinally thereof. These members are preferably of molded resilient material, such as rubber or the like, and are provided with complementary recesses 24 on their inner faces conforming generally to the configuration of the elongated member 14 and adapted to receive and encase said elongated portion.

As shown on the drawings, each of the recesses 24 is provided with upper and lower longitudinally extending depressions or channels 25 and 26 which embrace the upper and lower ribs 19 and 21, with the side walls of the recesses abutting the sides of these ribs so as to limit lateral shifting of the elongated portion 14 of the bearing 13 except so far as the natural resiliency of the material will permit. The recess 24 is also provided with a horizontal longitudinally extending slot or recess 27 which embraces the adjacent horizontal rib 22 of the elongated portion 14.

With particular reference to Fig. 8 of the drawings, it will be noted that the material of the cushioning member 15 adjacent the slot 27 is provided with recesses or voids 28 at intervals along its upper surface to provide a plurality of spaced abutments 29, and that the lower surface of the recess 27 is also formed with voids 31 to provide a pair of spaced abutments 32. In like manner, the ends of the recesses 24 are formed with voids 33 to provide a centrally disposed end abutment 34.

From the foregoing it will be apparent that when longitudinal or vertical strains are transmitted from the bearing 13 and elongated member 14 to the cushioning members the force is transmitted directly to the latter through the abutments 29, 32 and 34. When this occurs the material of these abutments is compressed and spread laterally into the recesses or voids 28, 31 and 33, thus insuring a free floating mounting between the bearing and the cushioning member 15 and parts connected thereto. It will also be apparent that the elongated portion 14 is free to tilt vertically within the cushioning members 15 a substantial amount, thus materially relieving the parts from stresses and strains incurred when the vehicle is started or stopped or when the vehicle and trailer change their relative levels, such as when traveling over an uneven road.

Another outstanding advantage of this construction is the material reduction in friction between the elongated portions and the cushioning members due to the relatively small areas of contact therebetween, thus prolonging the life of the cushioning members by minimizing the heat generated by friction.

The recesses or voids above described, not only result in a very substantial saving in material and reduction in the weight of the parts, but produce a cushioning device capable of absorbing the shocks and jars encountered in traveling over uneven roads and highways.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fifth wheel construction including upper and lower fifth wheel elements and a horizontal cross-shaft pivotally mounted on a chassis, the combination of a housing carried by the lower fifth wheel element, cushioning means disposed within said housing, and a bearing member journaled on said shaft and having a portion thereof disposed within said housing for free floating movement relative to said cushioning means.

2. In a fifth wheel construction including upper and lower fifth wheel elements and a horizontal cross-shaft pivotally mounted on a chassis, the combination of a housing carried by the lower fifth wheel element above said cross-shaft, a bearing member journaled on said cross-shaft and having an elongated portion disposed within said housing, and cushioning means disposed within said housing and surrounding said elongated portion in spaced relation thereto, thus to minimize friction between said elongated portion and said cushioning means and permit the free floating movement of said elongated member within said cushioning means.

3. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said cross shaft and having an elongated portion disposed within and extending longitudinally of said housing, and a pair of longitudinally extending cushioning members arranged one on each side of said elongated portion, said cushioning members having complementary recesses therein adapted to embrace opposite sides of said elongated member with substantial areas of certain surfaces of said elongated portion disposed in spaced relation to said cushioning members, thus to minimize friction therebetween and to permit the floating movement of said elongated member in a predetermined direction.

4. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said shaft and having an elongated portion disposed within and extending longitudinally of said housing, and a pair of longitudinally extending cushioning members arranged one on each side of said elongated portion, said cushioning members having complementary recesses therein adapted to embrace opposite sides of said elongated member, and said cushioning members being provided with spaced abutments extending into said recesses for engagement with said elongated member at intervals, whereby a substantial area of said elongated member is spaced from said cushioning members, thus to minimize friction therewith and to permit of the floating movement of said elongated member within said cushioning members in transverse directions.

5. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said shaft and having an elongated portion disposed within and extending longitudinally of said housing, and a pair of longitudinally extending cushioning members arranged one on each side of said elongated portion, said cushioning members having complementary recesses therein adapted to embrace opposite sides of said elongated member, and said cushioning members being provided with spaced abutments extending into said recesses for engagement with said elongated member at intervals, whereby a substantial area of said elongated member is spaced from said cushioning members thus to minimize friction therewith and to permit of the floating movement of said elongated member within said cushioning members in longitudinal and vertical directions.

6. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said shaft and having an elongated portion disposed within and extending longitudinally of said housing, and a pair of longitudinally extending cushioning members arranged one on each side of said elongated portion and in close contact with the walls of said housing throughout their entire inner surface area to confine said cushioning members against bodily movement relative to said housing, said cushioning members having complementary recesses therein adapted to embrace opposite sides of said elongated member, said cushioning members being provided with spaced abutments extending into said recesses for engagement at intervals with the ends and upper surface of said elongated member whereby a substantial area of said elongated member is spaced from said cushioning members thus to minimize friction therewith and to permit floating movement of said elongated member within said cushioning members in longitudinal and vertical directions.

7. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said shaft and having an elongated portion disposed within and extending longitudinally of said housing, said elongated portion being of cruciform cross section to provide horizontally and vertically disposed ribs, and a pair of longitudinally extending cushioning members arranged one on each side of said elongated portion, said cushioning members having complementary recesses therein adapted to embrace opposite sides of said elongated member, and said cushioning members being provided with spaced abutments extending into said recesses for engagement with the horizontally disposed rib of said elongated member at intervals, whereby a substantial area of said elongated member is spaced from said cushioning members, thus to minimize friction therewith and to permit floating movement of said elongated member within said cushioning members in longitudinal and vertical directions.

8. In a fifth wheel construction including upper and lower fifth wheel elements and a horizontal cross shaft pivotally mounted on a chassis, the combination of a hollow housing carried by the lower fifth wheel element above said cross shaft, a bearing member journaled on said shaft and having an elongated portion disposed within and extending longitudinally of said housing, said elongated portion being of cruciform cross section to provide horizontally and vertically disposed ribs, and a pair of longitudinally extending cushioning members arranged one on each side of said elongated portion, said cushioning members having complementary recesses therein adapted to embrace opposite sides of said elongated member, said cushioning members being disposed in close contact with said vertically disposed rib and provided with spaced abutments extending into said recesses for engagement with said horizontally disposed rib at intervals, whereby a substantial area of said elongated member is spaced from said cushioning members thus to minimize friction therewith and to permit a floating and tilting movement of said elongated member within said cushioning members in longitudinal and vertical directions.

CARL G. SEYFERTH.